United States Patent Office 3,184,504
Patented May 18, 1965

3,184,504
A-NOR-B-HOMO-Δ5(6)-ESTRENE-17β-OL-3-ONE AND 17β-ACYLOXY DERIVATIVES THEREOF
Georges Muller, Nogent-sur-Marne, and Jacques Martel, Bondy, France, assignors to Roussel-UCLAF, S.A., Paris, France, a corporation of France
No Drawing. Filed June 13, 1962, Ser. No. 202,094
Claims priority, application France June 19, 1961, 865,322; Jan. 8, 1962, 884,152
3 Claims. (Cl. 260—488)

The invention relates to novel A-nor-B-homo-Δ5(6)-estrene-3-ones having the formula

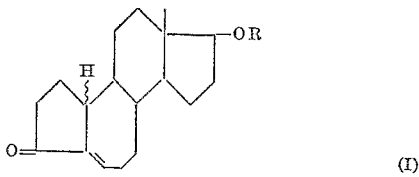

wherein R is selected from the group consisting of hydrogen and an acyl radical of an organic carboxylic acid having 1 to 18 carbon atoms. The invention also relates to a novel process for the preparation of A-nor-B-homo-Δ5(6)-estrene-3-ones of Formula I.

The A-nor-B-homo-Δ5(6)-estrene-3-ones of Formula I possess more active hormonal properties than the corresponding classical steroids and have less side effects. The compounds possess androgenic and anabolic activity and may be used in higher concentrations than the classical steroids due to their greater solubilities. The compounds of Formula I are also valuable intermediates for the preparation of other A-nor-B-homo steroids by chemical or microbiological means.

It is an object of the invention to provide the novel A-nor-B-homo-Δ5(6)-estrene-3-ones of Formula I.

It is another object of the invention to provide a novel process for the preparation of A-nor-B-homo-Δ5(6)-estrene-3-ones of Formula I.

These and other objects and advantages of the present invention will become obvious from the following detailed description.

The novel compounds of the invention are A-nor-B-homo-Δ5(6)-estrene-3-ones having the formula

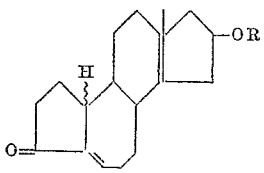

wherein R is selected from the group consisting of hydrogen and an acyl radical of an organic carboxylic acid having 1 to 18 carbon atoms. Examples of suitable organic carboxylic acids are preferably lower alkanoic acids such as acetic acid, propionic acid, butyric acid, etc. However, other organic carboxylic acids such as benzoic acid and substituted benzoic acids such as 3,5-dinitrobenzene acid; alkanedioic acids such as succinic acid; hydroxy carboxylic acids such as citric acid and lactic acid; and cycloalkyl carboxylic acids such as hexahydrobenzoic acid, etc., may be used.

The process of the invention for the preparation of A-nor-B-homo-Δ5(6)-estrene-3-ones of Formula I comprises catalytically reducing a 17β-acyloxy-A-nor-B-homo-estrane-3,6-dione which exists only in its enolic forms wherein the acyl radical is derived from an organic carboxylic acid having 1 to 7 carbon atoms to form a mixture of 17β-acyloxy-A-nor-B-homo-estrane-6ξ-ol-3-one and 17β-acyloxy-A-nor-B-homo-estrane-3ξ-ol-6-one, separately recovering the components of the mixture, dehydrating 17β-acyloxy-A-nor-B-homo-estrane-6ξ-ol-3-one under acid conditions to form 17β-acyloxy-A-nor-B-homo-Δ5(6)-estrene-3-one which may be saponified under alkaline conditions to A-nor-B-homo-Δ5(6)-estrene-17β-ol-3-one and recovering a A-nor-B-homo-Δ5(6)-estrene-3-one of Formula I.

A preferred mode of the process comprises catalytically reducing the enolic forms of 17β-acetoxy-A-nor-B-homo-estrane-3,6-dione in the presence of a palladium catalyst such as palladized carbon black and acetic acid to form a mixture of 17β-acetoxy-A-nor-B-homo-estrane-3ξ-ol-6-one and 17β-acetoxy-A-nor-B-homo-estrane-6ξ-ol-3-one, separately recovering the components of the mixture by crystallization and chromatography, dehydrating 17β-acetoxy-A-nor-B-homo-estrane-6ξ-ol-3-one by heating in the presence of an organic acid such as acetic acid to form 17β-acetoxy-A-nor-B-homo-Δ5(6)-estrene - 3 - one, saponifying the latter in the presence of an alkali metal hydroxide such as sodium hydroxide to form A-nor-B-homo-Δ5(6)-estrene-17β-ol-3-one and recovering the latter. The free alcohol may be esterified in the 17β position by reaction with a functional derivative of an organic carboxylic acid having 1 to 18 carbon atoms such as the acid anhydride or the acid halide. The reaction scheme is illustrated in Table I.

TABLE I

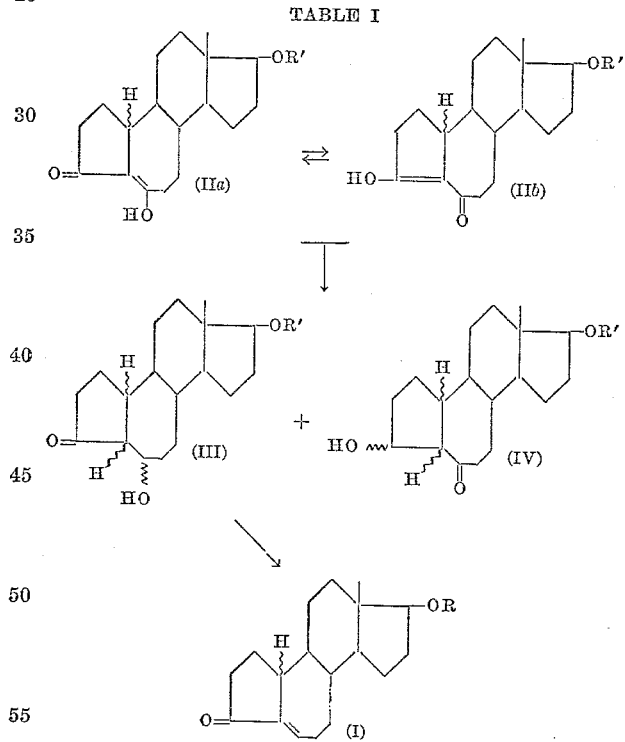

wherein R has the above definition and R' is an acyl radical of an organic carboxylic acid having 1 to 7 carbon atoms.

The 17β - acyloxy - A - nor-B-homo-estrane-3,6-diones starting materials are prepared according to the process described in the commonly assigned, copending application Serial No. 149,221, now U.S. Patent No. 3,061,636, which comprises reacting a 17β-acyloxy-Δ5(10)-estrene-3-one with ozone followed by reduction to form 17β-acyloxy-5,10-seco-estrane-3,5,10-trione, cyclizing the latter under acid conditions to form 17β-acyloxy-A-nor-B-homo-Δ5(10)-estrene-3,6-dione, reducing the latter with an alkali metal borohydride to form 17β-acyloxy-A-nor-B-homo-5ξ,10ξ-estrane-3,6-dione in its enolic forms.

In the following example there are disclosed several preferred embodiments to illustrate the invention. How-

EXAMPLE

*Preparation of 17β-hydroxy-A-nor-B-homo-Δ5(6)-estrene-3-one*

STEP A.—CATALYTIC REDUCTION OF THE ENOLIC FORMS OF 17β-ACETOXY-A-NOR-B-HOMO-ESTRANE-3,6-DIONE 2.68 g. of 17β-acetoxy-A-nor-B-homo-estrane-3,6-dione (enolic form melting at 168° C.) described in U.S. patent application Serial No. 149,221, now U.S. Patent No. 3,061,636, were dissolved in 25 cc. of acetic acid. 1.3 g. of palladized carbon black containing 20% of palladium were added and the mixture was hydrogenated for a period of 4 hours at room temperature. The mixture was filtered to remove the catalyst. 100 cc. of methylene chloride were added to the solution and the organic phase was washed with water until the wash waters were neutral. The solution was dried over magnesium sulfate and evaporated to dryness under vacuum. 2.7 g. of a mixture consisting essentially of 17β-acetoxy-A-nor-B-homo-estrane-6ξ-ol-3-one and 17β-acetoxy-A-nor-B-homo-estrane-3ξ-ol-6-one were obtained.

The mixture was taken up in 20 cc. of ether and the ethereal solution was allowed to stand until crystallization occurred. After the crystals were vacuum filtered, washed with ether, and dried, 520 mg. of crystallized 17β-acetoxy-A-nor-B-homo-estrane-6ξ-ol-3-one were obtained having a melting point of 200° C. and a specific rotation $[\alpha]_D^{20} = -145°$ (c.=0.5% in chloroform).

Its structure was confirmed by its spectral values in the infrared which showed the presence of a hydroxyl by a large band at 3598–3611 cm.$^{-1}$.

17β-acetoxy-A-nor-B-homo-estrane-6ξ-ol-3-one, which is new, was soluble in acetone, benzene, chloroform, alcohol and ether, and insoluble in water.

*Analysis.*—$C_{20}H_{30}O_4$: Molecular weight=334.44. Calculated: C, 71.82%; H, 9.04%. Found: C, 71.7%; H, 9.0%.

17β-acetoxy-A-nor-B-homo-estrane-3ξ-ol-6-one was separated by subjecting the ethereal mother liquors after removal of the 17β-acetoxy-A-nor-B-homo-estrane-6ξ-ol-3-one to chromatography through alumina with benzene. After recrystallization from hexane, 250 mg. of crystallized 17β-acetoxy-A-nor-B-homo-estrane-3ξ-ol-6-one were obtained having a melting point of 148° C. and a specific rotation $[\alpha]_D^{20} = +125°$ (c.=0.5% in chloroform).

Its structure is confirmed by the spectral values in the infrared which showed the presence of a hydroxyl and the presence of an absorbing carbonyl at 1685 cm.$^{-1}$ in chloroform, at 1688 cm.$^{-1}$ in carbon disulfide.

17β-acetoxy-A-nor-B-homo-estrane-3ξ-ol-6-one, which is new, was soluble in acetone, benzene, chloroform, alcohol and ether, and insoluble in water.

*Analysis.*—$C_{20}H_{30}O_4$: Molecular weight=334.44. Calculated: C, 71.82%; H, 9.04%. Found: C, 72.2%; H, 9.0%.

STEP B.—DEHYDRATION OF 17β-ACETOXY-A-NOR-B-HOMO-ESTRANE-6ξ-OL-3-ONE 0.8 g. of 17β-acetoxy-A-nor-B-homo-estrane-6ξ-ol-3-one was dissolved in 8 cc. of acetic acid. The mixture was heated for 45 minutes at reflux. After cooling and addition of water, the precipitate was vacuum filtered. The precipitate was washed with water, taken up with methylene chloride, and the washing with water was continued in a separatory funnel. The organic phase was dried over magnesium sulfate and evaporated to dryness under vacuum. The residue was taken up in benzene and subjected to chromatography over alumina. After elution with benzene, 0.575 g. of 17β-acetoxy-A-nor-B-homo-Δ5(6)-estrene-3-one was recovered which crystallized from hexane in the form of prismatic rods having a melting point 112–113° C. and a specific rotation $[\alpha]_D^{20} = -5° \pm 1°$ (c.=1% in chloroform). The yield was 75%.

The product, not described in the literature, occurred in the form of white prismatic crystals, and was soluble in ether, acetone, benzene and chloroform and insoluble in water.

*Analysis.*—$C_{20}H_{28}O_3$: Molecular weight=316.4. Calculated: C, 75.9%; H, 8.9%. Found: C, 76.3; H, 8.8.

I.R. spectra: 1 band at 1739 cm.$^{-1}$; 1 band at 1650 cm.$^{-1}$.

STEP C.—SAPONIFICATION OF 17β-ACETOXY-A-NOR-B-HOMO-Δ5(6)-ESTRENE-3-ONE

A mixture of 100 mg. of 17β-acetoxy-A-nor-B-homo-Δ5(6)-estrene-3-one obtained according to Step B, 2 cc. of a normal solution of sodium hydroxide and 2 cc. of ethanol was heated to reflux for a period of 30 minutes. After cooling, the reaction mixture was poured into water. The aqueous solution was extracted with chloroform and the chloroform was evaporated. The residue of 80 mg. of raw product so formed was triturated with petroleum ether. The petroleum ether was evaporated and pure A-nor-B-homo-Δ5(6)-estrene-17β-ol-3-one was obtained.

This product is new.

A-nor-B-homo-Δ5(6)-estrene-17β-ol-3-one may be acylated with a functional derivative of an organic carboxylic acid having 1 to 18 carbon atoms such as an acid anhydride or acid halide to form the corresponding 17β-acyloxy derivative.

Various modifications of the invention, such as different catalysts, solvents and reaction conditions may be made without departing from the spirit or scope thereof, and it is to be understood that the invention is to be limited only as defined in the appended claims.

We claim:

1. A-nor-B-homo-Δ5(6)-estrene-3-ones having the formula

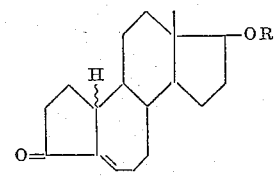

wherein R is selected from the group consisting of hydrogen and an acyl radical of an organic carboxylic acid selected from the group consisting of alkanoic acids, alkanedioic acids, hydroxy alkyl carboxylic acids, cycloalkyl carboxylic acids and phenyl carboxylic acids having 1 to 18 carbon atoms.

2. 17β-acetoxy-A-nor-B-homo-Δ5(6)-estrene-3-one.

3. A-nor-B-homo-Δ5(6)-estrene-17β-ol-3-one.

References Cited by the Examiner

UNITED STATES PATENTS

| | | | |
|---|---|---|---|
| 2,782,212 | 2/57 | Heusser et al. | 260—488 |
| 3,040,092 | 6/62 | Muller et al. | 260—488 |
| 3,138,635 | 6/64 | Muller et al. | 260—488 |

LORRAINE A. WEINBERGER, *Primary Examiner.*

LEON ZITVER, *Examiner.*